(12) United States Patent
Jerolm et al.

(10) Patent No.: US 11,483,240 B2
(45) Date of Patent: Oct. 25, 2022

(54) MASTER-SLAVE BUS SYSTEM AND METHOD FOR OPERATING A BUS SYSTEM

(71) Applicant: WAGO Verwaltungsgesellschaft mit beschraenkter Haftung, Minden (DE)

(72) Inventors: Daniel Jerolm, Bad Essen (DE); Frank Quakernack, Bielefeld (DE)

(73) Assignee: WAGO Verwaltungsgesellschaft mit beschraenkter Haftung, Minden (DE)

( * ) Notice: Subject to any disclaimer, the term of this patent is extended or adjusted under 35 U.S.C. 154(b) by 36 days.

(21) Appl. No.: 17/006,577

(22) Filed: Aug. 28, 2020

(65) Prior Publication Data

US 2020/0396161 A1 Dec. 17, 2020

Related U.S. Application Data (63) Continuation of application No. PCT/IB2019/050814, filed on Feb. 1, 2019.

(30) Foreign Application Priority Data

Feb. 28, 2018 (DE) ..................... 10 2018 001 574.3

(51) Int. Cl.
*H04L 12/741* (2013.01)
*H04L 45/74* (2022.01)
*H04L 12/40* (2006.01)

(52) U.S. Cl.
CPC .............. *H04L 45/74* (2013.01); *H04L 12/40* (2013.01)

(58) Field of Classification Search
CPC ....... H04L 12/403; H04L 12/40; H04L 45/74; H04L 69/324; H04L 12/40019;
(Continued)

(56) References Cited

U.S. PATENT DOCUMENTS

| 6,226,680 B1 | 5/2001 | Boucher et al. |
| 7,007,120 B2 * | 2/2006 | Spencer .............. G06F 13/4295 710/110 |

(Continued)

FOREIGN PATENT DOCUMENTS

| DE | 102004050424 A1 | 4/2006 |
| DE | 102004063213 A1 | 7/2006 |

(Continued)

OTHER PUBLICATIONS

Popp: "Industrial Communication with PROFINET", 2014, pp. 165-168, PROFIBUS Nutzerorganisation e.V.

(Continued)

*Primary Examiner* — Man U Phan
(74) *Attorney, Agent, or Firm* — Muncy, Geissler, Olds & Lowe, P.C.

(57) ABSTRACT

The subject of the invention is a system (1),
  having a master (900),
  a first slave (100),
  a second slave (200), and
  a bus (40), wherein the master (900) and the first slave (100) and the second slave (200) are connected to one another by the bus (40) in order to transmit a data packet (4) from the master (900) via the first slave (100) and back to the master (900) via the second slave (200),
  in which the master (900) is configured to generate the data packet (4) with a header (4.1) and a data unit (4.2) and to send the generated data packet (4) on the bus (40),
  in which the first slave (100) is configured to write its first address (A1) and first payload data (D1) into a first segment (10) of the data unit (4.2) of the data packet (4), (Continued)

in which the second slave (200) is configured to write its second address (A2) and second payload data (D2) into a second segment (20) of the data unit (4.2) of the data packet (4), in which the master (900) is configured to receive the data packet (4) from the bus (40) and to assign the first payload data (D1) to the first slave (100) on the basis of the first address (A1) and the second payload data (D2) to the second slave (200) on the basis of the second address (A2) and to further process the assigned first payload data (D1) and the assigned second payload data (D2).

18 Claims, 6 Drawing Sheets (58) Field of Classification Search
CPC ........... H04L 12/4015; H04L 12/40032; H04L 12/40071; H04L 12/741; H04L 29/08
USPC ........................................................ 370/392
See application file for complete search history.

(56) References Cited

U.S. PATENT DOCUMENTS

| | | | |
|---|---|---|---|
| 7,882,289 B2 * | 2/2011 | Furuya | G06F 13/4247 |
| | | | 710/110 |
| 8,006,022 B2 | 8/2011 | Hoffmann | |
| 8,014,401 B2 | 9/2011 | Radulescu | |
| 8,134,448 B2 | 3/2012 | Oster et al. | |
| 8,260,884 B2 | 9/2012 | Schmidt | |
| 8,675,679 B2 * | 3/2014 | Hofmann | G06F 13/4273 |
| | | | 710/36 |
| 9,112,642 B2 * | 8/2015 | Premke | H04L 61/5038 |
| 9,235,207 B2 * | 1/2016 | Biehler | H04L 12/40006 |
| 9,252,969 B2 * | 2/2016 | Rohatschek | H04L 12/43 |
| 9,460,035 B2 * | 10/2016 | Opitz | H04L 12/40032 |
| 9,585,053 B2 * | 2/2017 | Scheffel | H04L 12/40156 |
| 9,740,646 B2 | 8/2017 | Morris et al. | |
| 10,079,763 B2 * | 9/2018 | Bruckner | H04L 12/403 |
| 10,089,273 B2 * | 10/2018 | Teuke | G06F 13/4282 |
| 10,198,379 B2 | 2/2019 | Morris et al. | |
| 10,216,678 B2 * | 2/2019 | Murtaza | G06F 13/4068 |
| 10,572,418 B2 | 2/2020 | Fuchs | |
| 10,985,941 B2 * | 4/2021 | Jerolm | H04L 12/40019 |
| 11,063,850 B2 * | 7/2021 | Meyer | H04L 1/1607 |
| 2006/0092858 A1 | 5/2006 | Kynast et al. | |
| 2008/0279138 A1 | 11/2008 | Gonikberg et al. | |
| 2011/0153889 A1 | 6/2011 | Barrenscheen | |
| 2011/0286422 A1 | 11/2011 | Radulescu | |
| 2013/0210411 A1 | 8/2013 | Ojha et al. | |
| 2020/0192843 A1 | 6/2020 | Fuchs | |

FOREIGN PATENT DOCUMENTS

| | | |
|---|---|---|
| DE | 102005019970 A1 | 11/2006 |
| DE | 102006013578 A1 | 9/2007 |
| DE | 102007043769 A1 | 3/2009 |
| DE | 102012210243 A1 | 12/2013 |
| DE | 102017000930 B3 | 6/2017 |
| EP | 2110995 A1 | 10/2009 |
| EP | 2723010 A1 | 4/2014 |
| EP | 2466406 B1 | 3/2016 |
| EP | 3035199 A1 | 6/2016 |
| EP | 3151474 A1 | 4/2017 |
| WO | WO2006/129294 A1 | 12/2006 |

OTHER PUBLICATIONS

International Search Report dated Apr. 26, 2019 in corresponding application PCT/IB2019/050814.

* cited by examiner

MASTER-SLAVE BUS SYSTEM AND METHOD FOR OPERATING A BUS SYSTEM

This nonprovisional application is a continuation of International Application No. PCT/IB2019/050814, which was filed on Feb. 1, 2019, and which claims priority to German Patent Application No. 10 2018 001 574.3, which was filed in Germany on Feb. 28, 2018, and which are both herein incorporated by reference.

BACKGROUND OF THE INVENTION

Field of the Invention

The present invention relates to a system having a master, a first slave, a second slave, and a bus. The master, the first slave and the second slave are connected to one another by the bus in order to transmit a data packet from the master via the first slave and back to the master via the second slave.

Description of the Background Art

Master/slave is a form of hierarchical management of access to a shared resource usually in the form of a common data channel in numerous regulation and control problems. Only one common transmission channel is available for data transmission (e.g., as a radio link or in the form of a data bus). If a number of participants are transmitting simultaneously, transmission can no longer take place because only corrupted data then arrives on the bus at the receiving participants. A possibility must therefore be created for the participants to share the data channel by mutual agreement. One possibility is to use the master-slave principle. One participant is the master, all others are slaves. The master is the only one who has the right to access the shared resource without being asked. The slave cannot access the shared resource on its own; it must wait until it is asked by the master (polling) or it must indicate to the master that it wants to be asked via a connection that passes around the shared resource. The master-slave method is used in bus systems such as field buses, e.g., PROFIBUS, BITBUS, AS-I.

A method for the automatic generation of dynamic frame packing groups is known from EP 2 466 406 B1, which corresponds to U.S. Pat. No. 9,235,207. The concept of dynamic frame packing (DFP) was introduced to increase the transmission rate of data from field devices to controllers in automation systems. Data transmission is effected here using container frames. Terminal devices that are assigned to a packing group transmit their data inside this container frame. This results in the advantage that the overhead for Ethernet frames used is borne only once for a given transmission, because due to the container frame, only a preamble, a start frame delimiter, and a header are used, for example. This enables the packing density to be increased, so that data transmission by a plurality of field devices can occur within one clock cycle, the transmission refresh rate being significantly increased in comparison with a data transmission that would not use DFP.

It is known from "Industrial Communication with PROFINET," Manfred Popp, pages 165-168, from 2014 that for dynamic frame packing (DFP), the most distant node begins to send its input data in that this most distant node generates a data frame that has a header, a data unit, and a trailer. Each field device integrated in the communication has stored a virtual image of the entire data frame internally. It inserts its input data into the data frame and updates the header and trailer with regard to length and checksum. This requires exact timing, so that each field device knows when it must insert its input data into the data frame. The length of the data frame increases accordingly with each addition of input data by a field device and finally reaches the controller.

SUMMARY OF THE INVENTION

It is therefore an object of the present invention to provide a bus system whose communication in the direction from slaves to a master of the bus system is improved as much as possible.

Accordingly, a bus system having a master, a first slave, a second slave, and a bus is provided. The master and the first slave and the second slave are connected to one another by the bus. The bus can be designed as a serial bus. The bus can also be referred to as a local bus. In addition to the first slave and the second slave, one or more slaves can be connected to the bus in the bus system.

The bus connects the master and the first slave and the second slave to one another in order to transmit a data packet from the master via the first slave and back to the master via the second slave. The transmission path is preferably designed in the form of a ring. The data packet can pass through further slaves in the ring-shaped transmission path.

The master is configured to generate the data packet with a header and a data unit and to send the generated data packet on the bus. In contrast, the slaves of the bus system are preferably configured not to generate the data packet. The data packet generated by the master does not have the address of one of the slaves and is therefore not addressed to a specific slave. The data packet is transmitted proceeding from the master as a point to all slaves as participants in the bus system.

The first slave is configured to write its first address and first payload data into a first segment of the data unit of the data packet. The first slave is preferably configured to form the first segment of the data unit independently of the master. The first slave is advantageously configured to set at least one length of the first segment. According to this refinement, the master is not configured to form the first segment.

The second slave is configured to write its second address and second payload data into a second segment of the data unit of the data packet. The second slave is preferably configured to form the second segment of the data unit independently of the master. The second slave is advantageously configured to set at least one length of the second segment. According to this refinement, the master is not configured to form the second segment.

The master is configured to receive the data packet from the bus. The same data packet generated by the master comes back to the master supplemented with the first payload data and the second payload data. The master is configured to assign the first payload data to the first slave on the basis of the first address and to assign the second payload data to the second slave on the basis of the second address. The master is configured to further process the assigned first payload data and the assigned second payload data.

The master is advantageously configured for further processing the first payload data and/or the second payload data in addressed memory areas associated with the respective first or second address. For further processing, the master is advantageously configured to write the first payload data and/or the second payload data on the basis of the first or second address in one or more registers. The master is advantageously configured by the master's software with regard to the further processing to evaluate the first payload data and/or the second payload data. The master is advantageously configured with regard to the further processing to forward the first payload data and/or the second payload data via an interface of the master, separate from the bus, in particular a fieldbus interface or a service interface.

The data unit of the data packet can have a fixed size during transmission via the bus. The size of the data packet is therefore not changed by any of the slaves after it has been generated by the master. The master is advantageously configured to generate the data packet with an empty data unit. Therefore, the data packet does not transmit any data to one of the slaves within the data unit. The master is advantageously configured to set the fixed size of the data unit. In contrast, the fixed size cannot be changed by the first slave or the second slave. The first and second payload data can only be written by the first and second slave into the data packet data unit generated by the master, therefore, only between the header and the data unit end set by the master.

The master can be configured to define the fixed size of the data unit of the data packet on the basis of a message. The message is advantageously contained in a previously received data packet. The first slave and/or the second slave are advantageously configured to send the message. To send the message, the first slave and/or second slave are advantageously configured to write values into the header or the data unit of the previous data packet.

The first slave can be configured to define a size of a blank section in the data unit of the data packet and a size of the first payload data. The first slave is preferably configured to write its first address and its first payload data into the first segment, if the size of the first payload data does not exceed the size of the blank section. Otherwise, the first slave preferably does not write any payload data into the data unit.

The first slave can be configured to write the message into the header and/or into the data unit of the data packet, if the size of the first payload data to be sent exceeds the size of the blank section. As described above, the message is received by the master and serves as the basis for defining the fixed size of the data unit in the data packet.

The second slave can be configured to define a size of a blank section in the data unit of the data packet and a size of the second payload data. The size of the blank section is crucial when it is received by the second slave. Thus, the first slave can already have written payload data into the first segment, so that part of the data unit has already been written and the blank section has thereby been reduced. The second slave is preferably also configured to write its second address and its second payload data into the second segment, if the size of the second payload data does not exceed the size of the blank section.

The second slave can be configured to write the message into the header or into the data unit of the data packet, if the size of the second payload data exceeds the size of the blank section. In other words, each slave can only write if there is sufficient space in the data unit. In addition, other conditions can allow or prohibit writing by the particular slave.

The master can be configured to generate the data packet on the basis of a specific event and/or cyclically. For example, the data packet can always be sent by the master at a predetermined point in time within a cycle frame. In addition, in the case of high data traffic, the master can send the data packet additionally even more often.

The master can be configured to insert a master priority into the data packet. The master priority is determined by the master for a data packet and can vary from data packet to data packet. The master priority is a control data item by means of which only payload data that have a high priority are transmitted from the slaves to the master. Low priority payload data can be postponed using the master priority.

The first slave can be configured to compare the master priority, contained in the data packet, with a first payload data priority of the first payload data. The first slave is preferably configured to write its first address and its first payload data into the first segment, if the master priority is not higher than the first payload data priority. In contrast, the first slave does not write its first payload data into the data unit, if the master priority is higher than the first payload data priority. Thus, if the master priority is too high, the first slave would have to wait for a subsequent data packet that has a master priority that is low enough.

The first slave can be configured to write a priority message into the header and/or into the data unit of the data packet, if the master priority is higher than the first payload data priority. The master is advantageously configured to receive and evaluate the priority message.

The second slave can be configured to compare the master priority, contained in the data packet, with a second payload data priority of the second payload data. The second slave is preferably configured to write its second address and its second payload data into the second segment, if the master priority is not higher than the second payload data priority.

The second slave can be configured to write a priority message into the header and/or into the data unit of the data packet, if the master priority is higher than the second payload data priority.

The master can be configured to evaluate the priority message and to adapt the master priority for a subsequent data packet on the basis of the evaluation of the priority message. For example, the master priority could be reduced if the priority message was received by the master and at the same time no data transmission of higher priority payload data is requested by the slaves.

The first slave and/or second slave can be configured to define a blank section in the data unit of the data packet. The defining of the blank section is preferably based on a packet length specification in the header of the data packet, and/or a segment header within the data unit of the data packet, and/or a counting of already written sections of the data unit of the data packet.

Also, a slave of a bus system is provided. The slave has a transmitting/receiving circuit which can be connected to a bus of the bus system. The slave has a computing unit, in particular a state machine, which is connected to the transmitting/receiving circuit. The slave has a memory area which is connected to the computing unit. The transmitting/receiving circuit is configured to receive a data packet with a header and a data unit, wherein the data unit can have a blank section. The computing unit is configured to define the size of the blank section. The computing unit is configured to compare the size of the blank section in the data unit of the data packet and a size of the payload data stored in the memory area. The computing unit and the transmitting/receiving circuit are configured to write an address and the stored payload data into a segment in the data unit of the data packet, if the size of the stored payload data does not exceed the size of the blank section.

A further aspect of the invention is a master of a bus system. The master has a transmitting circuit which can be connected to a bus of the bus system. The master has a receiving circuit which can be connected to the bus of the bus system. The master has a computing unit, in particular a state machine, which is connected to the transmitting circuit and to the receiving circuit. The computing unit is configured to generate a data packet with a header and a data unit. The header of the data packet has an identifier which sets the type of the data packet for a communication direction for payload data from slaves, connected to the bus, to the master. The transmitting circuit is configured to send the generated data packet on the bus. The receiving circuit is configured to receive the data packet from the bus. The computing unit is configured to assign the payload data to at least one slave on the basis of an address and to further process the assigned payload data.

The master can be configured to define a length of the data packet. The header of the data packet advantageously has a length specification about the length of the data packet.

The master can be configured to send a plurality of data packets of a different type on the bus. Process data are advantageously transmitted within a cycle frame, therefore, cyclically. Process data are preferably data that are associated with a system-controlled process, for example, measurement data from sensors and/or control data for controlling actuators. Asynchronous data, e.g., control or configuration or programming data, are preferably transmitted as payload data in the data packet between the cyclically transmitted process data. The data packet is advantageously sent on the bus in a gap between cyclically transmitted process data. The data packet is preferably sent by the master as an empty packet, in particular for collecting in particular payload data of the slaves, to be transmitted asynchronously. Alternatively, the data packet can also be used as payload data for transmitting cyclic or asynchronous process data.

A further aspect of the invention is a method for operating a bus system.

The method can include: generating a data packet with a header and a data unit by a master. The data unit of the data packet just generated is preferably empty, in particular filled with zero values. The data unit can advantageously be written by slaves. The generation of the data packet is preferably based on a specific event and/or is carried out continuously, in particular cyclically by the master.

The method can include: sending the data packet from the master to a first slave and to a second slave. In this regard, the data packet is sent by the master on the bus that connects the master and slaves.

The method can include: writing a first address and the first payload data of the first slave into a first segment of the data unit of the data packet by the first slave.

The method can include: writing a second address and the second payload data of a second slave into a second segment of the data unit of the data packet by the second slave.

The method can include: receiving the data packet with the written first segment and the written second segment from the bus by the master.

The method can include: assigning the first payload data to the first slave on the basis of the first address by the master. The method has a step: assigning the second payload data to the second slave on the basis of the second address by the master.

The assigning is advantageously carried out by addressing a memory area or the switching by means of a switch on the basis of the first address and the second address. For example, the master recognizes and reads out the first address on the basis of its position in the first segment header. Based on the first address read out, the payload data of the first slave are written by the master into an associated memory area by addressing the memory area.

For example, the second payload data of the second slave are written into a register by means of a multiplexer; in so doing, the switching of the multiplexer is controlled on the basis of the second address of the second slave by means of a lookup table (LUT), and the assignment is thus made.

The method can include: further processing the assigned first payload data and the assigned second payload data by the master.

The method steps can basically be carried out in a different sequence, provided that no sequence results from dependencies. In principle, the method steps do not have to follow one another directly. It is also possible that further steps are inserted in time between the method steps. A new sequence can also be established in this way.

A previous data packet can be transmitted time-wise before the data packet. A subsequent data packet is advantageously transmitted time-wise after the data packet. A size of the data unit of the data packet is preferably set by the master on the basis of a message which is contained in the previous data packet. The message is advantageously written into the previous data packet by the first slave and/or the second slave.

However, the data packet is successively sent to all slaves of the bus system in the sense of a broadcast or multicast. It is therefore not necessary to multiply the data packet. The data packet just sent by the master does not contain any addresses; therefore, it is not addressed to a specific slave. However, the data packet just sent by the master also does not contain any payload data that are to be sent by the master to the slaves. The data packet is accordingly empty. In this sense, the data packet is a request to the slaves to write their payload data, initially directed to the master, into the data packet. Due to the limited size of the data packet, it is possible that not all slaves can write their payload data into the data packet. In order to nevertheless inform the master that further payload data are to be sent from at least one slave to the master, the message is inserted by the respective slave, for example, in the form of a code. Based on the message, the master generates further data packets to fetch payload data from the slaves.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitive of the present invention, and wherein.

DETAILED DESCRIPTION

Figure 1:
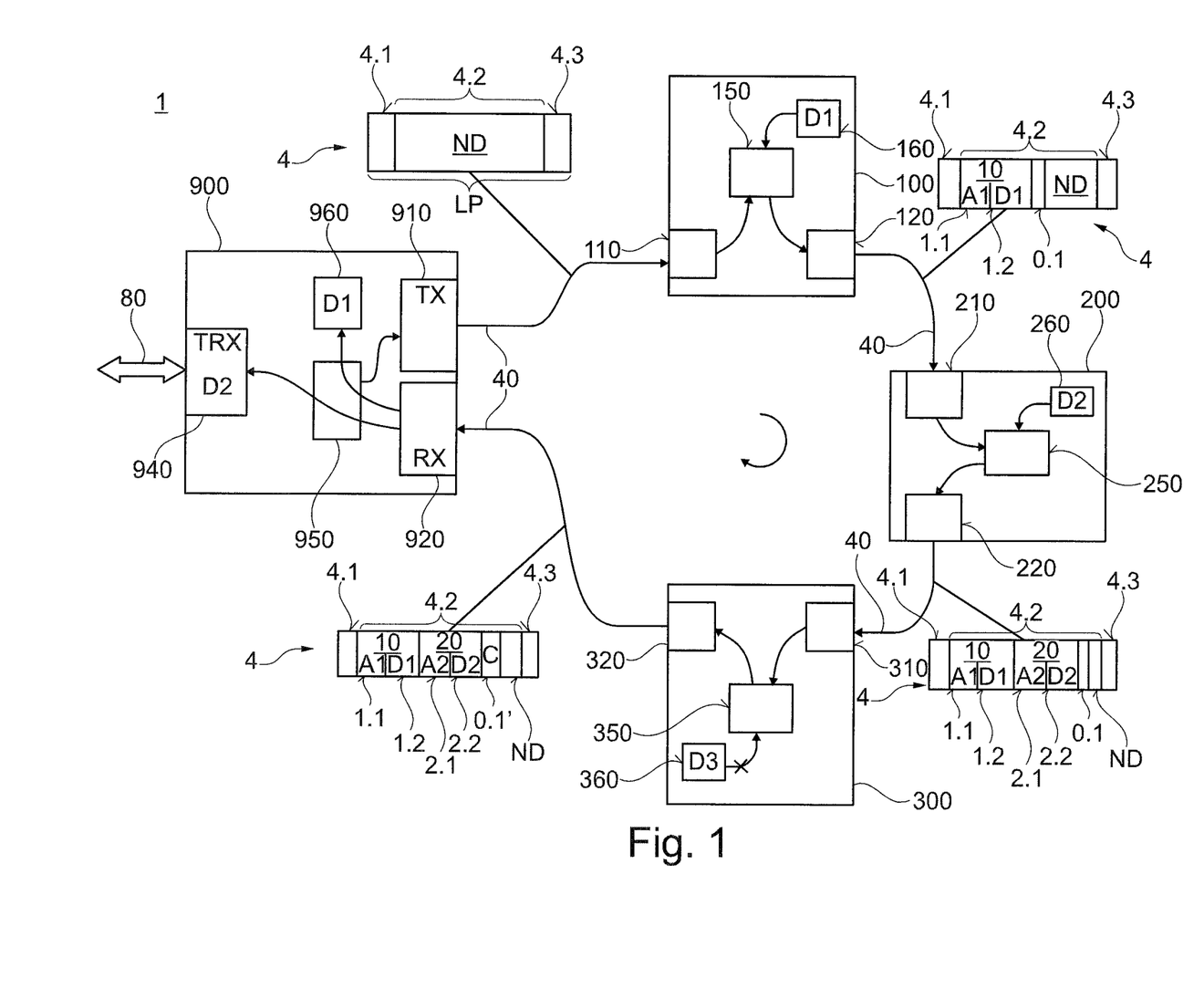
FIG. 1 shows a schematic representation of an exemplary embodiment of a bus system.
Figure 2:
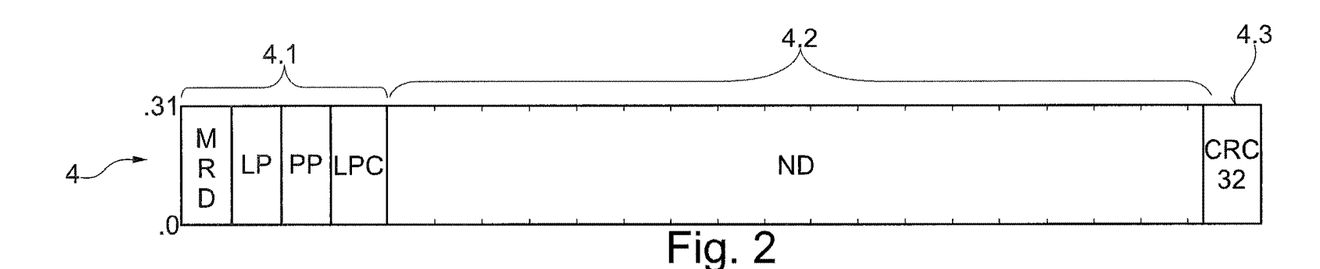
FIGS. 2, 2a, 2b show schematic representations of an exemplary embodiment of a data packet.

Data packet 4 shown in FIGS. 1 and 2 allows master 900 to read payload data D1, D2, D3 from each slave 100, 200, 300. In this regard, for example, a first slave 100 holds first payload data D1 of a certain priority ready for transmission. Data packet 4 is configured to transport payload data D1, D2, D3 from a plurality of slaves 100, 200, 300. The number of slaves 100, 200, 300 that can share one and the same data packet 4 for payload data transmission is limited by the size of a data unit 4.2 of data packet 4.

Figure 2A:
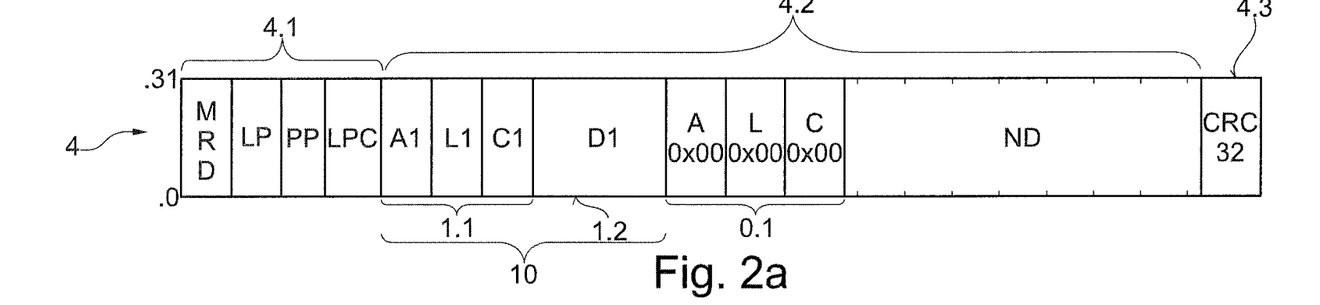
Figure 2B:
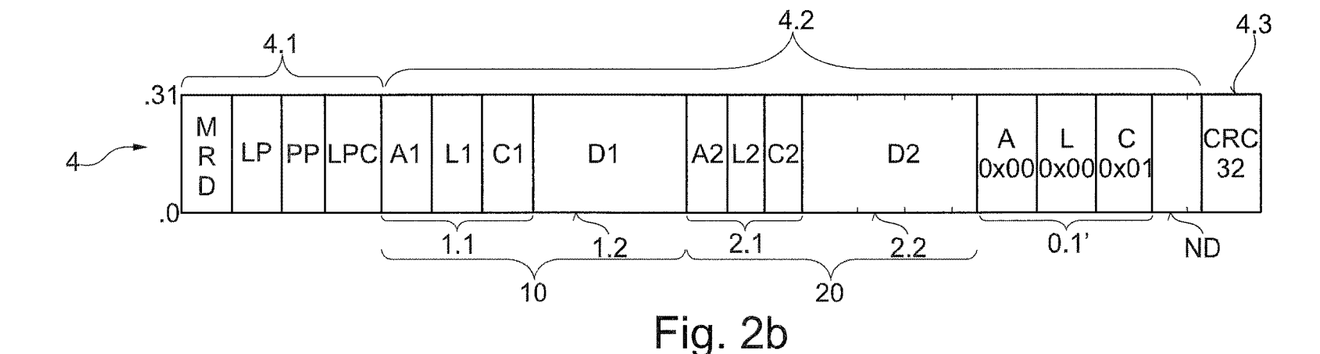

In the exemplary embodiment of FIGS. 2, 2a, and 2b, a data packet 4 with a header 4.1, a data unit 4.2, and a trailer 4.3 is shown schematically. The three representations in FIGS. 2, 2a, and 2b show the same data packet 4 at different times, wherein data unit 4.2 is changed by slaves 100, 200. In this regard, data packet 4 is shown in the initial state in FIG. 2.

FIG. 2b shows that segments 10, 20 are formed in data unit 4.2 of data packet 4. Within data unit 4.2, each segment 10, 20 has its own segment header 1.1, 2.1 for payload data D1, D2 and its own payload data unit 1.2, 2.2 for payload data D1, D2. If there is sufficient space for a segment header 0.1' after the last payload data unit 2.2, slave 200 writing last into data unit 4.2 adds an end segment header, so that a blank section ND of data unit 4.2 has its own segment header.

The last writing slave 200 fills the end segment header with zero values 0x00. FIG. 2b shows data packet 4 after it has passed through another slave 300. The fields of segment header 0.1' written by preceding slave 200 all have the value 0x00 with the exception of the counter value C, wherein a counter value C is stored which can be changed, for example, incremented, by further slave 300, if the blank section ND for payload data D3 of this slave 300 is not large enough. This case is shown in FIG. 2b.

Each slave 100, 200, 300 in bus system 1 has a computing unit 150, 250, 350, which is configured to process data packet 4. Accordingly, data packet 4 is processed by a computing unit 150, 250, 350 of slave 100, 200, 300, which has payload data D1, D2, D3 ready for transmission to master 900. In addition, the payload data can be prioritized (not shown in the exemplary embodiment in FIG. 1).

FIG. 1 shows an exemplary scenario of a bus system 1 with a master 900 and a first slave 100 and a second slave 200 and a third slave 300 and a bus 40, which connects master 900 and slaves 100, 200, 300 to one another. Bus system 1 in the exemplary embodiment in FIG. 1 is shown in simplified form. Existing bus systems often have a significantly larger number of slaves that are integrated into the communication with master 900.

In the exemplary embodiment in FIG. 1, master 900 has a first interface with a transmitting circuit 910 and a receiving circuit 920 for connecting to bus 40. In addition, master 900 has a second interface for connecting to a fieldbus 80, for example, a ProfiNET or EtherCAT or a time-sensitive network (TSN) according to IEEE 802.1. Accordingly, bus 40 is a subordinate bus and fieldbus 80 is a higher-level bus. Bus 40 can also be referred to as a local bus. Slaves 100, 200, 300 are often disposed in the vicinity of master 900, advantageously mechanically attached to the housing of master 900. In the exemplary embodiment of FIG. 1, master 900 is configured to convert data telegrams, received via field bus 80, into data packets of local bus 40 and vice versa. Accordingly, master 900 can also be referred to as a coupler.

Bus 40 connected to the first interface of master 900 is configured to transmit data packet 4. Master 900 is configured to generate data packet 4. In particular, a computing unit 950 of master 900 is configured to generate a data packet 4 with a header 4.1 and a data unit 4.2. After generation, data packet 4 is sent from master 900 to bus 40. Data packet 4 sent by master 900 is shown schematically in FIG. 1. It has a header 4.1, a data unit 4.2, and a trailer 4.3. Immediately after transmission by master 900, data unit 4.2 is exclusively occupied by a blank section ND. Data packet 4 is accordingly sent empty by master 900; therefore, it has no payload data. Accordingly, data packet 4 immediately after being sent by master 900 can also be referred to as an empty data packet 4. Empty data packet 4 has the length LH. Master 900 does not write an address of a slave 100, 200, 300 into data packet 4. Data packet 4 is accordingly directed to all slaves 100, 200, 300 of system 1.

Data packet 4 is transmitted by all slaves 100, 200, 300 and then back to master 900. Accordingly, in the exemplary embodiment in FIG. 1, the transmission path for data packet 4 through bus 40 is formed ring-shaped. In this regard, in the exemplary embodiment in FIG. 1, it is not necessary that data packet 4 must first be completely received by first slave 100 before it is forwarded to second slave 200. Rather, data packet 4 can be transmitted in sections, for example, using symbols, from one to the next participant 900, 100, 200, 300. For example, first slave 100 sends the previously received first symbol of data packet 4 to second slave 200, while first slave 100 simultaneously receives the second symbol from master 900. This significantly reduces latencies. A symbol preferably has a fixed number of bits, for example, 4, 8, 16, or 32 bits. In the exemplary embodiment in FIGS. 2, 2a, and 2b, a data packet 4 with symbols with a bit width of exemplary 32 bits is shown schematically.

In the exemplary embodiment in FIG. 1, data packet 4 passes from master 900 via bus 40 and a number of slaves 100, 200, 300 back to master 900. From master 900, data packet 4 first reaches first slave 100 via the first slave input interface 110. Data packet 4 reaches second slave 200 from first slave output interface 120 of first slave 100 via bus 40 and second slave input interface 210. Data packet 4 reaches third slave 300 from second slave output interface 220 of second slave 200 via bus 40 and third slave input interface 310. Data packet 4 comes back to master 900 from third slave output interface 320 of third slave 300 via bus 40 and input interface 920. Accordingly, data packet 4 is not newly generated by any of the slaves 100, 200, 300. Slaves 100, 200, 300 cannot change the length LH of data packet 4. The transmission of payload data D1, D2, D3 in the direction from slaves 100, 200, 300 to master 900 is thus limited by the length LH of data packet 4. In order to nevertheless enable a dynamic adaptation of the transmission bandwidth, master 900 is advantageously configured to change the length LH and/or the number of data packets 4 within one cycle. The change in the length LP and/or the number of data packets 4 is carried out by master 900 preferably on the basis of information that master 900 receives in particular from slaves 100, 200, 300.

In the exemplary embodiment in FIG. 1, first slave 100 has stored first payload data D1 in a memory area 160. By means of computing unit 150, first slave 100 inserts first payload data D1 in a first segment 10 in data unit 4.2 of data packet 4. Accordingly, data packet 4 sent by first slave 100 is shown schematically in FIG. 1. First segment 10 has a first segment header 1.1 and a first segment data unit 1.2 with the first payload data D1. First slave 100 has written its first address A1 into first segment header 1.1. First slave 100 has appended an empty segment header 0.1 with only the values 0x00 to payload data D1 in first segment 10; this is followed by a blank section ND within data unit 4.2 and by trailer 4.3 of data packet 4.

In the exemplary embodiment in FIG. 1, second slave 200 has stored second payload data D2 in a memory area 260. By means of computing unit 250, second slave 200 inserts second payload data D2 in a second segment 20 in data unit 4.2 of data packet 4. Accordingly, data packet 4 sent by second slave 200 is shown schematically in FIG. 1. Second segment 20 immediately follows first segment 10 and has a second segment header 2.1 and a second segment data unit 2.2 with the second payload data D2. Second segment header 2.1 here replaces the previous empty segment header 0.1 before data packet 4 is received by second slave 200. Second slave 200 has written its second address A2 into second segment header 2.1. Second slave 200 has again appended an empty segment header 0.1 with only the values 0x00 to second payload data D2 in second segment 20; this is followed by a remaining blank section ND within data unit 4.2 and by trailer 4.3 of data packet 4.

In the exemplary embodiment in FIG. 1, however, the remaining blank section ND in data unit 4.2 before data packet 4 is received by third slave 300 is so small that third payload data D3 of third slave 300 do not fit into the remaining blank section ND. Accordingly, computing unit 350 of third slave 300 cannot fetch third payload data D3 from memory area 360 and write it into data packet 4 (indicated schematically in FIG. 1 by an X). In the exemplary embodiment in FIG. 1, third slave 300 inserts a message C into empty segment header 0.1 in data packet 4. For example, a value of the message is defined as counter value C, which is changed, in particular incremented or decremented, by third slave 300. Alternatively, the message C can also be generated by setting a bit or the like. The message C is shown in data packet 4, which is shown schematically on receiving circuit 920 of master 900 in FIG. 1. Accordingly, a modified segment header 0.1' is shown before the blank section ND.

In the exemplary embodiment in FIG. 1, master 900 has a computing unit 950, which is connected to transmitting circuit 910 and to receiving circuit 920. Computing circuit 950 has, for example, a state machine. In the exemplary embodiment in FIG. 1, data packet 4 is received by receiving circuit 920 of master 900. In this regard, computing unit 950 is configured to assign the first payload data D1 with first address A1 to first slave 100. In the simplest case, the assignment can be made by comparing the first address received in first segment 10 with a predetermined address value. If these match, first payload data D1 are written into a memory area 960, for example, at a predetermined memory address or into a predetermined register and, e.g., read out within software, further calculated, etc. In the exemplary embodiment in FIG. 1, second payload data D2 from second segment 20 are assigned to second slave 200 on the basis of second address A2. In the exemplary embodiment in FIG. 2, second payload data D2 are provided, for example, for forwarding via fieldbus 80, so that the further processing includes a writing of second payload data D2 in transceiver 940 to fieldbus 80.

In the exemplary embodiment in FIG. 1, first payload data D1, second payload data D2, and third payload data D3 can be transmitted, for example, as process data for a process, in particular for a manufacturing process. These are, for example, sensor and/or actuator data. Alternatively, in the exemplary embodiment in FIG. 1, system data, in particular for configuration, parameterization, programming, and/or initialization, can be transmitted as first payload data D1, second payload data D2, and third payload data D3. System data serve to set individual participants 100, 200, 300 of system 1 or to read out information such as, for example, the status or parameters.

In the exemplary embodiment in FIG. 1, the process data are transmitted cyclically, for example, at one or more predetermined points in time within a cycle frame. The system data are transmitted disjunctly to the process data. In this case, the system data are transmitted asynchronously. In the exemplary embodiment in FIG. 1, master 900 is advantageously configured to transmit data packet 4 disjunctly, therefore, in a transmission gap of the process data. Master 900 is configured to define a fixed size of data unit 4.2 before sending data packet 4. In the exemplary embodiment in FIG. 1, the defining of the fixed size of data unit 4.2 is based, in one respect, on a size of a transmission gap between two process data transmissions. In addition, the determination of the fixed size of data unit 4.2 is based on the message C of a previous data packet 4', wherein the message comes from one or more of the slaves 100, 200, 300 of system 1.

Another data packet 4 with a detailed structure is shown schematically in the exemplary embodiment in FIGS. 2, 2a, and 2b. In a departure from the exemplary embodiment in FIG. 1, the data packet 4 shown has a large number of shown data fields. In the exemplary embodiment in FIGS. 2, 2a, 2b, each data field has a bit width of 32 bits (0.0 to 0.31). Data packet 4 has a header 4.1, a data unit 4.2, and a trailer 4.3. A value for the cyclic redundancy check CRC32 is transmitted in trailer 4.3. However, a trailer 4.3 and a cyclical redundancy check are not absolutely necessary. Header 4.1 of data packet 4 has an identifier MRD which sets the type of data packet 4 for a communication direction for payload data D1, D2 from slaves 100, 200, 300, connected to bus 40 (shown, e.g., in FIG. 1 or FIG. 3), to master 900 (shown, e.g., in FIG. 1 or FIG. 4). In addition, header 4.1 of data packet 4 in the exemplary embodiment in FIG. 2 has a length specification LP about the length LH of data packet 4, a master priority PP, and a priority message LPC. In this case, header 4.1 is generated by master 900, wherein slaves 100, 200, 300 are configured to read out the data fields MRD, LP, PP, LPC of header 4.1.

The same data packet 4 is shown in FIGS. 2, 2a, and 2b, but in FIGS. 2a and 2b changes to data unit 4.2 have been made by slaves 100, 200, 300. FIG. 2 shows data packet 4 in the initial state as it can be generated by a master 900. Data unit 4.2 is empty and therefore has the blank section ND. Only the data in header 4.1 is generated by the master. The exemplary embodiment can be seen in FIGS. 2, 2a, and 2b in which data packet 4 has a fixed length LH, which is set by master 900. Based on the length LH of data packet 4, master 900 writes the length specification LP in header 4.1 of data packet 4. Neither the length LH nor the length specification LP can be changed by slaves 100, 200, 300.

Slaves 100, 200, 300 are also configured to change only the priority message LPC in header 4.1, in particular to increment or overwrite it. Slaves 100, 200, 300 are configured to use the priority message LPC to inform master 900 that a payload data priority P1 associated with payload data D1 is lower than the master priority PP. Accordingly, master 900 can react to this and generate a new data packet 4 with an adjusted master priority PP on the basis of the message LPC.

A first segment 10 is formed in data unit 4.2 of data packet 4 of the exemplary embodiment in FIG. 2a. This first segment 10 is written into data unit 4.2 of data packet 4 by a slave 100. First segment 10 has a first segment header 1.1 and a first segment payload data unit 1.2 into which first payload data D1 of slave 100 are written. Data packet 4 is received with this first segment 10 by a slave 200 that follows in the transmission path of bus 40.

In the exemplary embodiment in FIG. 2a, a first address A1, a first segment length L1, and a first counter value C1 are present in first segment header 1.1. The first counter value C1 is defined, for example, as a message from an in particular subsequent slave 200, 300 to master 900. If the subsequent slave 200 could not, for example, write its payload data D2 into the blank section ND, second slave 200 could increase the first counter value C1 (this case is not shown in FIG. 2*a*).

A plurality of segments 10, 20 are formed in data unit 4.2 of data packet 4 of the exemplary embodiment in FIG. 2*b*. In principle, each segment 10, 20 could be positioned at any position within data unit 4.2. However, the data within data unit 4.2 are preferably not fragmented. In the exemplary embodiment in FIG. 2*b*, first segment 10 and second segment 20 are next to one another. Data unit 4.2 is advantageously filled starting from header 4.1 or trailer 4.3. In the exemplary embodiment in FIG. 2*b*, first segment 10 is directly next to header 4.1 and second segment 20 is directly next to first segment 10. Segments 10, 20 overwrite the previously blank section ND, which, for example, has only zero values or one values or approved random values or predetermined bit patterns.

Second segment 20 has a second segment header 2.1 and a second segment payload data unit 2.2 into which second payload data D2 are written. In the exemplary embodiment in FIG. 2*b*, a second address A2, a second segment length L2, and a second counter value C2 are present in second segment header 2.1. The second counter value C2 is defined, for example, as a message from a slave 300 to master 900. In the exemplary embodiment in FIG. 2*b*, there is sufficient space for an end segment header 0.1' after the last payload data unit 2.2. Accordingly, slave 200 last writing in data unit 4.2 has attached an end segment header 0.1' to the last payload data unit 2.2. In this regard, the address A and the length L and the counter value C initially have zero values 0x00. However, this state with only zero values is not shown in FIG. 2*b*.

In the exemplary embodiment in FIG. 2*b*, a blank section ND still follows the end segment header 0.1'. In the exemplary embodiment in FIG. 2*b*, however, this is too small for all other slaves that still follow to write payload data. In the exemplary embodiment in FIG. 2*b*, the counter value C has the value 0x01, which is different from zero and was incremented, e.g., by slave 300, because this slave 300 could not write its payload data into data unit 4.2. Master 900 is advantageously configured to dynamically adapt the fixed size of consecutive data packets 4 during operation during the transmission, on the basis of a message, in particular at least one of the fields LPC, C1, C2, C.

Figure 3:
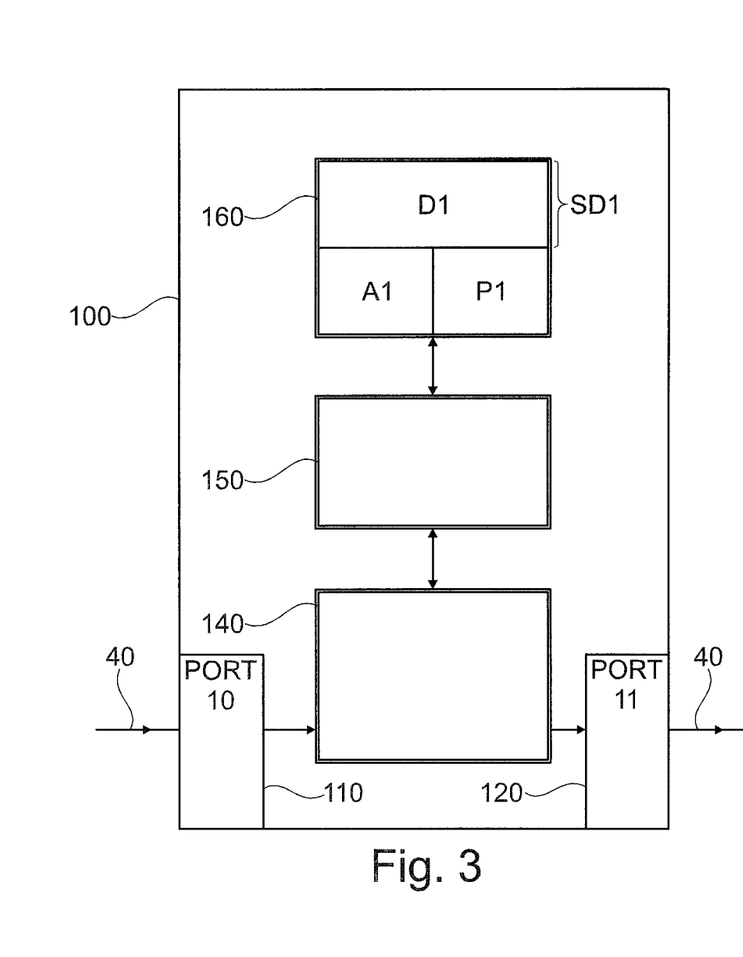
FIG. 3 shows a schematic representation of an exemplary embodiment of a slave of a bus system.

A slave 100 of a bus system is shown schematically as a block diagram in FIG. 3. Slave 100 has a first interface 110 (PORT10) and a second interface 120 (PORT11) for connecting to bus 40. Slave 100 is configured to receive bus data from bus 40 via first interface 110 and to send it to bus 40 via second interface 120.

Slave 100 has a transmitting/receiving circuit 140 which is connected to a bus 40 via first interface 110 and second interface 120. In the exemplary embodiment in FIG. 3, transmitting/receiving circuit 140, first interface 110, and second interface 120 are configured to process exactly one data symbol with a fixed length of, for example, 4, 8, 16, or 32 bits. For example, transmitting/receiving circuit 140 loads exactly one field, shown in FIG. 2, with 32 bits as the data symbol. One or more of the 32 bits can now be read and/or overwritten before the data symbol is sent via second interface 120 to a subsequent slave (not shown). The receiving, processing, and sending of a data symbol lasts a set number of cycles and is therefore strictly determined in terms of time.

Slave 100 also has a computing unit 150 which is connected to transmitting/receiving circuit 140. Computing unit 150 can be designed as a processor, but in the exemplary embodiment in FIG. 3, computing unit 150 is designed as a state machine, for example, in an ASIC or FPGA. Slave 100 has a memory area 160 which is connected to computing unit 150. Memory area 160 is, for example, an addressable area of a RAM. Alternatively, memory area 160 can be formed from a plurality of registers.

Transmitting/receiving circuit 140 is configured to receive a data packet (4, in FIG. 2) with a header 4.1 and a data unit 4.2, wherein data unit 4.2 can have a blank section ND. Computing unit 150 is configured to define the size of the blank section ND. Computing unit 150 determines the size of the blank section ND, for example, on the basis of the length specification LP in header 4.1 of data packet 4, and on the basis of segment length specifications L1, L2, etc.

Computing unit 150 is configured to compare the size of the blank section ND in data unit 4.1 of data packet 4 and a size SD1 of payload data D1 stored in memory area 160. The size SD1 of payload data D1 stored in memory area 160 is shown schematically in FIG. 3. Computing unit 150 and transmitting/receiving circuit 140 are configured to write an address A1 and the stored payload data D1 into a segment 10 in data unit 4.1 of data packet 4, if the size SD1 of the stored payload data D1 does not exceed the size of the blank section ND.

In the exemplary embodiment in FIG. 3, a payload data priority P1 associated with payload data D1 is stored in memory area 160. Slave 100 is configured to compare the master priority (PP in FIG. 2), contained in the data packet, with the payload data priority P1 of payload data D1. Slave 100 then writes its address A1 and its payload data D1 into a segment 10 in data unit 4.1, if the master priority PP is not higher than the payload data priority P1.

Figure 4:
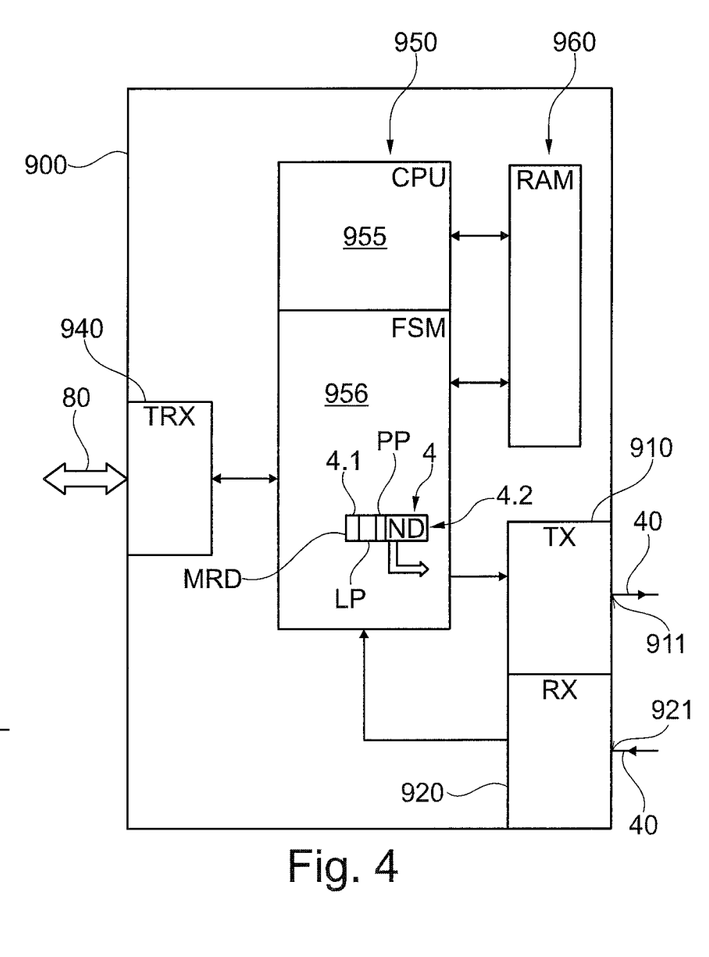
FIG. 4 shows a schematic representation of an exemplary embodiment of a master of a bus system.

In the exemplary embodiment in FIG. 4, a master 900 of a bus system is shown schematically as a block diagram. Master 900 has a first interface 911 and a second interface 921 for connecting to a bus 40. Master 900 is configured to send data packet 4 via first interface 911 to bus 40 and to receive data packet 4 via second interface 921 from bus 40. Master 900 has a transmitting circuit 910 (TX) which, in the exemplary embodiment in FIG. 4, is connected to a bus 40 of the bus system via interface 911. Master 900 has a receiving circuit 920 (RX) which, in the exemplary embodiment in FIG. 4, is connected to a bus 40 of the bus system via second interface 921.

Master 900 has a computing unit 950, which is connected to transmitting circuit 910 and to receiving circuit 920. In the exemplary embodiment in FIG. 4, computing unit 950 has a state machine 956 FSM (state automaton) and a processor 955 (CPU). In addition, master 900 has a memory area 960 (RAM). Both state machine 956 of computing unit 950 and processor 955 are connected to memory area 960 for reading and writing. State machine 956 and processor 955 are integrated, for example, on a semiconductor chip. In this regard, for example, processor 955 is formed by a CPU and state machine 956 by an FPGA of the semiconductor chip.

In the exemplary embodiment in FIG. 4, master 900 also has a transceiver circuit 940 (TRX) for connecting to a higher-level bus 80, for example, an EtherCAT bus, another field bus with a proprietary communication protocol, or a bus in accordance with the open OPC UA and TSN protocols. Transceiver circuit 940 is connected to state machine 956 of computing unit 950.

State machine 956 of computing unit 950 of master 900 is configured to generate a data packet 4 with a header 4.1 and a data unit 4.2, for example, analogously to the exemplary embodiment in FIG. 2. Header 4.1 of data packet 4 has an identifier MRD which sets the type of data packet 4 for a communication direction for payload data D1, D2, D3 from slaves 100, 200, 300, connected to bus 40, to master 900. The exemplary embodiment in FIG. 4 shows that state machine 956 generates data packet 4 with the identifier MRD, a length specification LP, a master priority PP, and a blank section ND in data unit 4.2. In the exemplary embodiment in FIG. 4, computing unit 950 of master 900 is configured to define a length of data packet 4 on the basis of messages previously received from slaves 100, 200, 300 and to map the length of data packet 4 in the length specification LP.

Transmitting circuit 910 is configured to send the generated data packet 4 on bus 40. Receiving circuit 920 is configured to receive data packet 4 from bus 40 after it has at least partially passed through all the slaves 100, 200, 300 of the bus system. Computing unit 950 is configured to assign, e.g., the payload data D1, shown in FIG. 1, on the basis of an address A1 to at least one slave 100 and to further process the assigned payload data D1. For further processing, master 900 forwards payload data D1 to a control station, for example, via transceiver 940 and the higher-level bus 80 (not shown in FIG. 4). Alternatively, master 900 can have a software program that is stored in memory area 960 and can be processed by processor 950. Payload data D1, D2, D3 are evaluated by means of the software program. For example, master 900 is configured to reconfigure slaves 100, 200, 300 on the basis of the evaluation of payload data D1, D2, D3.

Figure 5A:
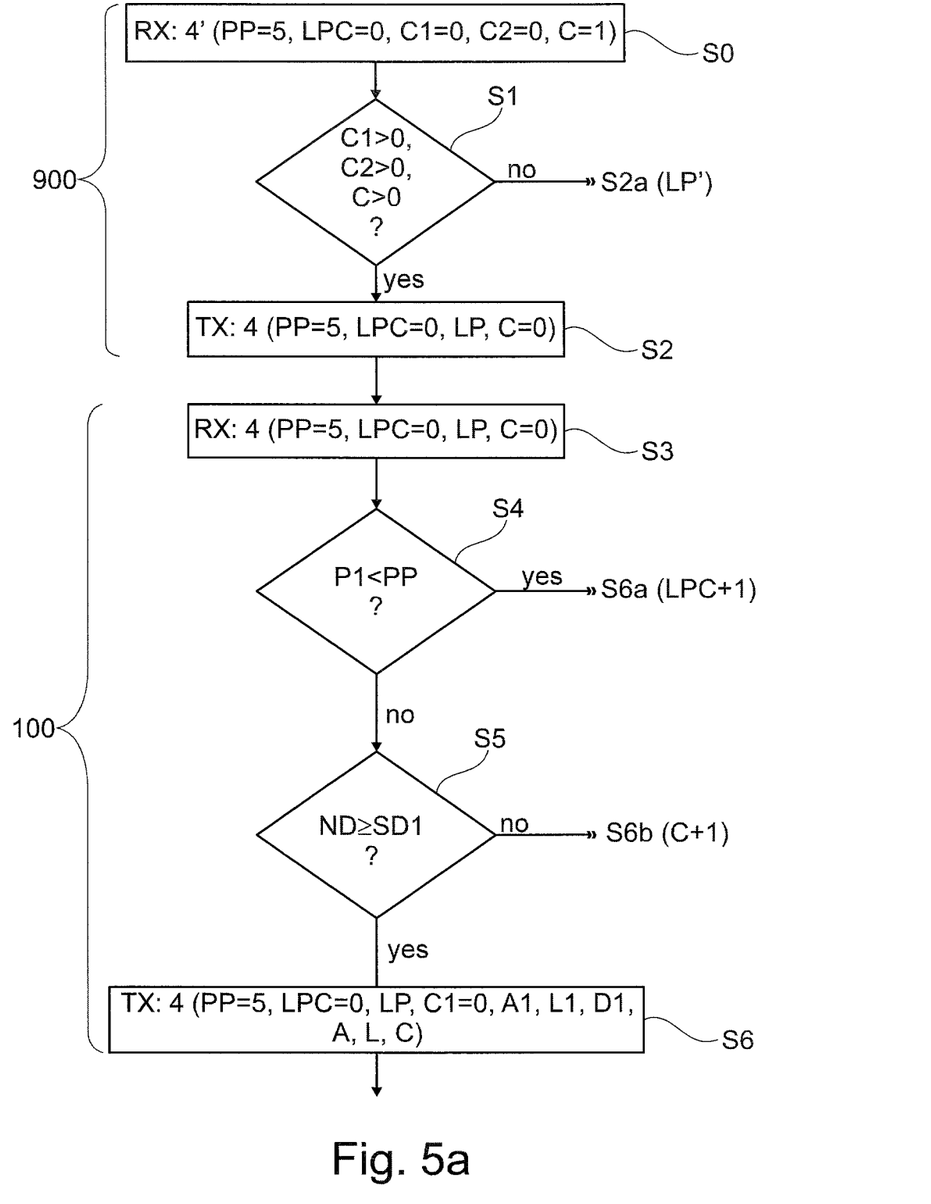
FIGS. 5a, 5b, 5c show schematic flowcharts of exemplary embodiments of method steps.
Figure 5B:
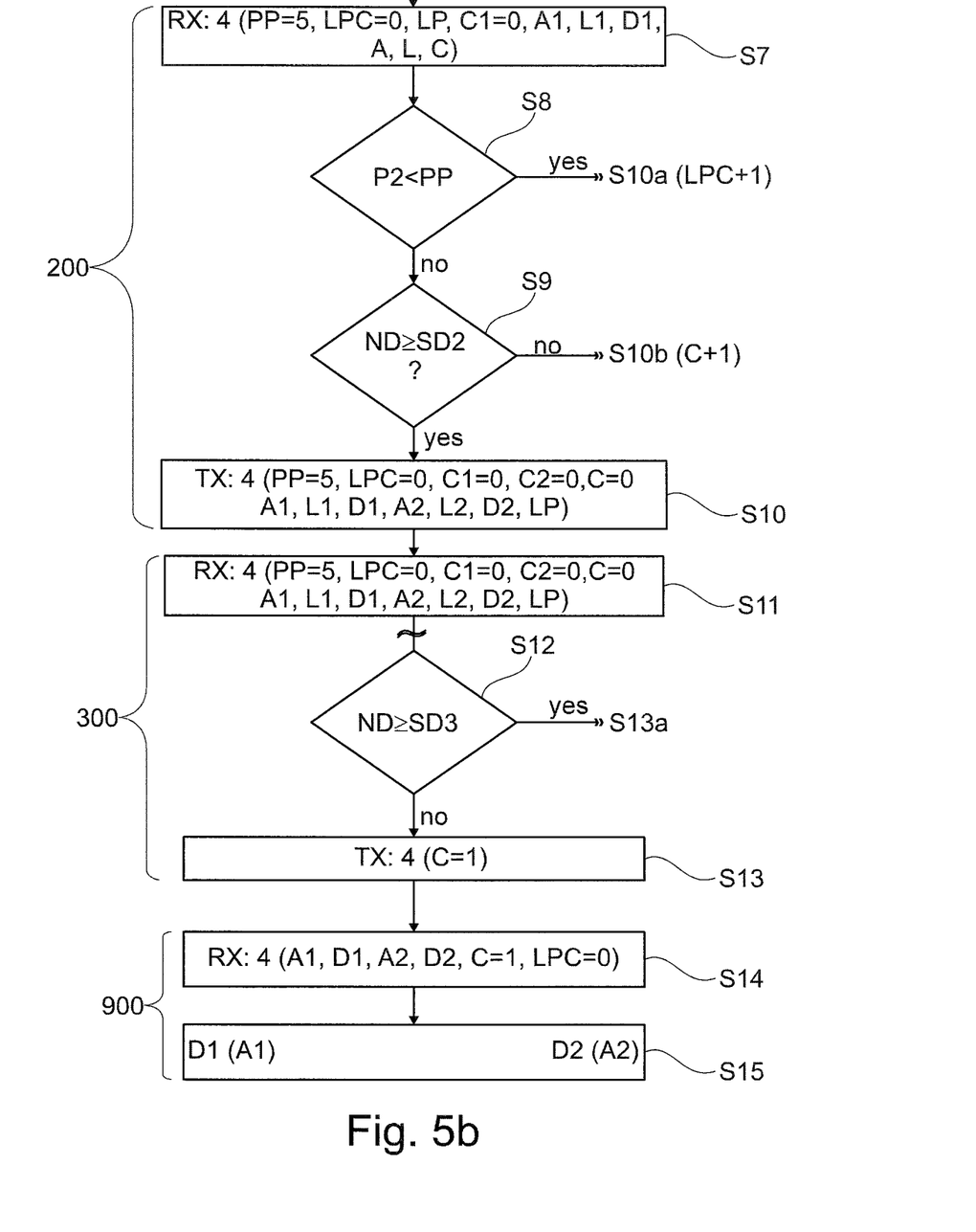
Figure 5C:
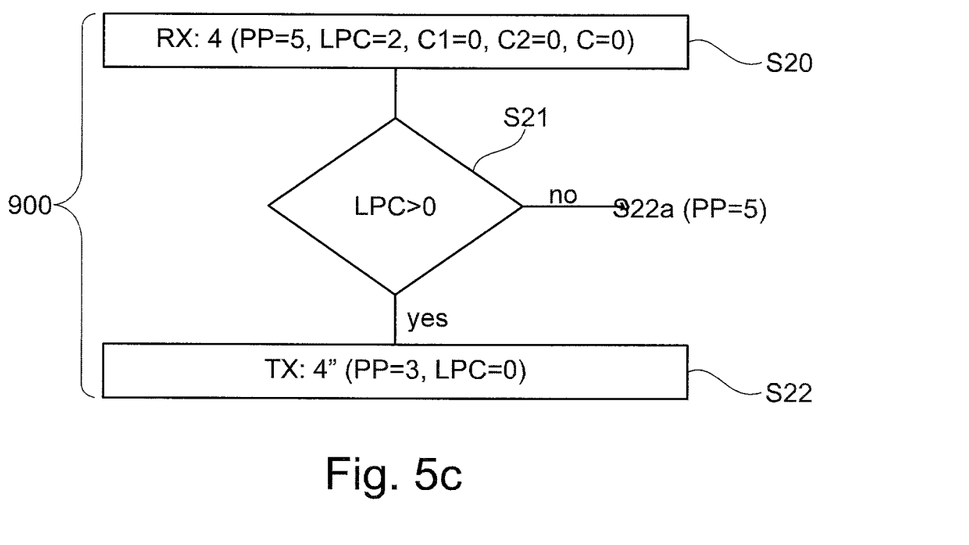

In FIGS. 5*a*, 5*b*, and 5*c*, parts of process sequences are shown schematically by flowcharts. In the exemplary embodiment in FIG. 5*a*, method steps S0 to S2 take place in master 900 and method steps S3 to S6 in a first slave 100. In the exemplary embodiment in FIG. 5*b*, method steps S7 to S10 take place in a second slave 200 and method steps S11 to S13 in a third slave 300, and method steps S14 and S15 in master 900. In the exemplary embodiment in FIG. 5*c*, method steps S20 to S22 take place in master 900. The method steps shown are not exhaustive; thus, further method steps, not shown, can be inserted or two or more method steps can be combined.

In a step S0, a previous data packet 4' is received by master 900. This previous data packet 4' was originally also sent by master 900 (not shown in FIG. 5*a*). The previous data packet 4' was sent with the master priority PP=5. Because slaves 100, 200, 300 cannot change the master priority PP=5, this previous data packet 4' is received with the unchanged master priority PP=5. Furthermore, the previous data packet 4' contains the message LPC=0, C1=0, C2=0, and C=1. Reference is made to the explanations for FIG. 2 for the meaning of the individual fields of the message.

In step S1 of the exemplary embodiment in FIG. 5*a*, master 900 checks whether there is a message by comparing the counter fields of the segments C1, C2 and the counter field C of the end segment header 0.1' with zero values. If, according to the comparison, a counter value is not equal to zero, step S2 follows; if all counter values are equal to zero, step 2*a* follows.

In step S2 of the exemplary embodiment in FIG. 5*a*, a data packet 4 is sent by master 900, with the values PP=5, LPC=0, the length specification LP, and an end segment header 0.1 with the counter value C=0.

In step S2*a*, not explained in more detail, of the exemplary embodiment in FIG. 5*a*, a data packet 4 would possibly only be sent later, after a timer had expired, or a data packet with a reduced length LP' would be sent.

In the exemplary embodiment in FIG. 5*a*, step S3 follows step S2. In step S3, data packet 4 is received by first slave 100. In step S4 of the exemplary embodiment in FIG. 5*a*, the master priority PP is compared with the first payload data priority P1 of the first payload data D1 of first slave 100. If the first payload data priority P1 is lower than the master priority PP, step 6*a* follows, in that slave 100 increases the priority counter value LPC in header 4.1 of data packet 4 by one (LPC+1).

In the exemplary embodiment in FIG. 5*a*, however, the first payload data priority P1 is equal to or higher than the master priority PP, so that step S5 follows in this case. In step S5, a first size SD1 of the first payload data D1 is compared with a size of a blank section ND. If the first size SD1 of first payload data D1 is larger than the size of the blank section ND, step S6*b* follows, wherein slave 100 transmits a message to master 900 by increasing the counter value C by one (C+1).

In the exemplary embodiment in FIG. 5*a*, however, the first size SD1 of first payload data D1 is equal to or smaller than the size of the blank section ND, so that step S6 follows. In step 6, first slave 100 transmits data packet 4 further, wherein a part of the blank section ND is overwritten with a first segment 10, wherein first segment 10 has a first address A1, a first segment length specification L1, and first payload data D1. In addition, first slave 100 can append an empty segment header 0.1 with the fields A, L, and C with zero values 0x00 to the first payload data D1.

In the exemplary embodiment in FIG. 5*b*, another part of a process sequence is schematically represented by a flowchart, which can follow the part of a process sequence shown in FIG. 5*a*.

In the exemplary embodiment in FIG. 5*b*, step S7 takes place first. In step S7, data packet 4 is received by second slave 200. In step S8 of the exemplary embodiment in FIG. 5*b*, the master priority PP is compared with the second payload data priority P2 of the second payload data D2 of second slave 200. If the second payload data priority P2 is lower than the master priority PP, step 10*a* follows, in that second slave 200 increases the priority counter value LPC in header 4.1 of data packet 4 by one (LPC+1). Other values A, L, C, etc., can remain unchanged.

In the exemplary embodiment in FIG. 5*b*, however, the second payload data priority P2 is equal to or higher than the master priority PP, so that step S9 follows in this case. In step S9, a second size SD2 of second payload data D2 is compared with a size of an as yet blank section ND. If the second size SD2 of second payload data D2 is larger than the size of the as yet blank section ND, step S10*b* follows, wherein second slave 200 transmits a message to master 900 by increasing the counter value C by one (C+1). Other values A, C, etc., can remain unchanged.

In the exemplary embodiment in FIG. 5*b*, however, the second size SD2 of second payload data D2 is equal to or smaller than the size of the as yet blank section ND, so that step S10 follows. In step 10, second slave 200 transmits data packet 4, wherein a part of the as yet blank section ND is overwritten with a second segment 20, wherein second segment 20 has a second address A2, a second segment length specification L2, and second payload data D2.

In the exemplary embodiment in FIG. 5*b*, data packet 4 with first segment 10 and second segment 20 and a remaining blank section ND is received in step S11. The steps of the third slave 300 are shown in a shortened manner in FIG. 5*b* for better clarity. All slaves 100, 200, 300 preferably process the same steps. In step S12, a size of the remaining blank section ND is compared with a third size SD3 of third payload data D3 by third slave 300. If the size of the remaining blank section ND is equal to or larger than the third size SD3 of third payload data D3, step 13a follows (not explained in more detail).

In the exemplary embodiment in FIG. 5b, the case is shown that the size of the remaining blank section ND is smaller than the third size SD3 of third payload data D3, step S13 follows accordingly. In step 13, third slave 300 does not insert a segment into data packet 4 due to the remaining blank section ND being too small, but third slave 300 only increases the counter value to C=1.

In the exemplary embodiment in FIG. 5b, data packet 4 with first segment 10 and second segment 20 and the counter value C=1 is received by master 900 in step S14. In addition, further symbols are received by master 900, as shown, for example, in the exemplary embodiment in FIG. 2b.

In the exemplary embodiment in FIG. 5b, in the following step S15, master 900 assigns first payload data D1 to first slave 100 on the basis of first address A1 and second payload data D2 to second slave 200 on the basis of second address A2. In addition, the assigned first payload data D1 and second payload data D2 are processed further by master 900 in step S15. In the exemplary embodiment in FIG. 5b, the further processing includes, e.g., storing and forwarding and evaluating the assigned payload data D1, D2.

FIG. 5c schematically shows a section of a process sequence of another exemplary embodiment. In this regard, in a step S20, a data packet 4 is received by master 900. Data packet 4 has a master priority PP=5 and a priority message LPC=2. The master priority PP=5 and priority message LPC=2 are evaluated by master 900. In the case shown in FIG. 5c, thus, two slaves could not write any payload data into data packet 4 due to the master priority PP being too high. For evaluation, the priority message LPC is compared with a zero value in step S21 by master 900. If the priority message LPC is not greater than zero, step 22a follows. In this regard, in step 22a, e.g., another data packet (not shown) with the same master priority PP=5 is sent again.

In the exemplary embodiment in FIG. 5c, the priority message LPC=2 is greater than zero, so that step S22 follows. In step S22, master 900 sends a data packet 4″ following data packet 4, wherein the master priority PP=3 is reduced and the priority message LPC is set to zero. Accordingly, payload data of low priority (e.g., 3 or 4) can also be transmitted with the following data packet 4″ from the slave to master 900.

The exemplary embodiments of method sections explained above are purely exemplary. Thus, depending on the structure and configuration of the system, adaptation of the steps may be necessary; in particular the steps can be carried out in a different order, or further steps can be added, or method steps can be omitted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system comprising:
a master;
a first slave;
a second slave; and
a bus,
wherein the master and the first slave and the second slave are connected to one another by the bus in order to transmit a data packet from the master via the first slave and back to the master via the second slave,
wherein the master generates the data packet with a header and a data unit and sends the generated data packet on the bus,
wherein the first slave writes a first address and a first payload data of the first slave into a first segment of the data unit of the data packet,
wherein the second slave writes a second address and a second payload data of the second slave into a second segment of the data unit of the data packet,
wherein the master receives the data packet from the bus and assigns the first payload data to the first slave based on the first address and assigns the second payload data to the second slave based on the second address and processes the first payload data and the second payload data, and
wherein the first slave defines a size of a blank section in the data unit of the data packet and a size of the first payload data, and wherein the first slave writes the first address and the first payload data into the first segment if the size of the first payload data does not exceed the size of the blank section.

2. The system according to claim 1, wherein the data unit of the data packet has a fixed size during the transmission via the bus, and wherein the master sets the fixed size of the data unit.

3. The system according to claim 2, wherein the master defines the fixed size of the data unit of the data packet based on a message, wherein the message is contained in a previously received data packet, and wherein the first slave and/or the second slave send the message.

4. The system according to claim 1, wherein the first slave writes the message into the header and/or into the data unit of the data packet if the size of the first payload data exceeds the size of the blank section.

5. The system according to claim 1, wherein the second slave defines a size of a blank section in the data unit of the data packet and a size of the second payload data, and wherein the second slave writes the second address and the second payload data into the second segment if the size of the second payload data does not exceed the size of the blank section.

6. The system according to claim 5, wherein the second slave writes the message into the header or into the data unit of the data packet if the size of the second payload data exceeds the size of the blank section.

7. The system according to claim 1, wherein the master generates the data packet based on a specific event and/or cyclically.

8. The system according to claim 1, wherein the master inserts a master priority into the data packet.

9. A system comprising:
a master;
a first slave;
a second slave; and
a bus,
wherein the master and the first slave and the second slave are connected to one another by the bus in order to transmit a data packet from the master via the first slave and back to the master via the second slave,
wherein the master generates the data packet with a header and a data unit and sends the generated data packet on the bus, wherein the first slave writes a first address and a first payload data of the first slave into a first segment of the data unit of the data packet, wherein the second slave writes a second address and a second payload data of the second slave into a second segment of the data unit of the data packet, wherein the master receives the data packet from the bus and assigns the first payload data to the first slave based on the first address and assigns the second payload data to the second slave based on the second address and processes the first payload data and the second payload data, wherein the master inserts a master priority into the data packet, and wherein the first slave compares the master priority contained in the data packet with a first payload data priority of the first payload data, and wherein the first slave writes the first address and the first payload data into the first segment if the master priority is not higher than the first payload data priority.

10. The system according to claim 9, wherein the first slave writes a priority message into the header and/or into the data unit of the data packet if the master priority is higher than the first payload data priority.

11. The system according to claim 9, wherein the second slave compares the master priority contained in the data packet with a second payload data priority of the second payload data, and wherein the second slave writes the second address and the second payload data into the second segment if the master priority is not higher than the second payload data priority.

12. The system according to claim 11, wherein the second slave writes a priority message into the header and/or into the data unit of the data packet if the master priority is higher than the second payload data priority.

13. The system according to claim 10, wherein the master evaluates the priority message and adapts the master priority for a subsequent data packet based on the evaluation of the priority message.

14. A system comprising:
   a master;
   a first slave;
   a second slave; and
   a bus,
   wherein the master and the first slave and the second slave are connected to one another by the bus in order to transmit a data packet from the master via the first slave and back to the master via the second slave,
   wherein the master generates the data packet with a header and a data unit and sends the generated data packet on the bus,
   wherein the first slave writes a first address and a first payload data of the first slave into a first segment of the data unit of the data packet,
   wherein the second slave writes a second address and a second payload data of the second slave into a second segment of the data unit of the data packet,
   wherein the master receives the data packet from the bus and assigns the first payload data to the first slave based on the first address and assigns the second payload data to the second slave based on the second address and processes the first payload data and the second payload data, and
   wherein the first slave and/or the second slave define a blank section in the data unit of the data packet based on:
   a packet length specification in the header of the data packet, and/or
   a segment header within the data unit of the data packet, and/or
   a counting of already written sections of the data unit of the data packet.

15. A slave of a bus system comprising:
   a transmitting/receiving circuit that is connectable to a bus of the bus system;
   a computing unit that is connectable to the transmitting/receiving circuit; and
   a memory area that is connectable to the computing unit,
   wherein the transmitting/receiving circuit receives a data packet with a header and a data unit,
   wherein the data unit has a blank section,
   wherein the computing unit defines a size of the blank section and a size of a payload data,
   wherein the computing unit compares the size of the blank section in the data unit of the data packet and the size of the payload data stored in the memory area, and
   wherein the computing unit and the transmitting/receiving circuit write an address and the payload data into a segment in the data unit of the data packet if the size of the payload data does not exceed the size of the blank section.

16. A method for operating a bus system, the method comprising:
   generating, via a computing unit of a master, a data packet with a header and a data unit;
   sending, via a transmitting circuit of the master, the data packet from the master to a first slave and to a second slave;
   writing, via the first slave, a first address and a first payload data of the first slave into a first segment of the data unit of the data packet;
   writing, via the second slave, a second address and a second payload data of the second slave into a second segment of the data unit of the data packet,
   receiving, via receiving circuit of the master, the data packet with the first segment and the second segment from the bus,
   assigning, via the computing unit of the master, the first payload data to the first slave based on the first address,
   assigning, via the computing unit of the master, the second payload data to the second slave based on the second address, and
   processing, via the computing unit of the master, the first payload data and the second payload data by the master,
   wherein the first slave defines a size of a blank section in the data unit of the data packet and a size of the first payload data, and wherein the first slave writes the first address and the first payload data into the first segment if the size of the first payload data does not exceed the size of the blank section.

17. The slave according to claim 15, wherein the computing unit is a state machine.

18. The master according to claim 16, wherein the computing unit includes a state machine.

* * * * *